3,271,459
PRODUCTION OF METHACROLEIN
William F. Brill, Skillman, and Alfio J. Besozzi, East Brunswick, N.J., assignors to Petro-Tex Chemical Corporation, Houston, Tex., a corporation of Delaware
No Drawing. Filed June 27, 1963, Ser. No. 290,916
6 Claims. (Cl. 260—604)

This invention relates to a high temperature process for oxidizing olefins to unsaturated aldehydes and relates more particularly to a high temperature process for the oxidation of isobutylene to methacrolein and propylene to acrolein.

Elemental silver and silver oxide have been used commercially as catalysts in oxidizing ethylene to ethylene oxide in vapor phase and in oxidizing acrolein to acrylic acid in liquid phase. Although silver oxide is a well known oxidation catalyst, it is used primarily at temperatures below 400° C. It is desirable to utilize reaction temperatures above 400° C. to increase the space time yields of oxygenated products. However, at temperatures above 400° C., silver oxide catalysts generally cause uncontrollable and non-selective oxidation reactions. This is particularly so when olefins containing 3 or more carbon atoms are utilized as the feed in the oxidation reaction.

It is an object of this invention to provide an improved process for producing unsaturated aldehydes over a silver base catalyst that will not have the disadvantages generally encountered in oxidizing olefins at high temperatures with silver catalysts. Another object of this invention is to provide a useful process with an improved silver type catalyst at high temperatures to efficiently oxidize isobutylene and propylene to their respective unsaturated aldehydes and to reduce loss of valuable reactants by non-selective oxidation. Other objects will be apparent from the following description of the invention. These objects are accomplished by passing a mixture of an olefin and oxygen at temperatures above 400° C. over a silver base catalyst modified with a phosphorus compound.

The olefins that may be employed in the operation of this invention generally contain at least 3 carbon atoms and not more than 8 carbon atoms and include such olefins as propylene, isobutylene, 2,4,4-trimethylpentene-1,2,4,4-trimethylpentene-2, and the like. Generally the use of $C_3$ and $C_4$ olefins is preferred. However, the $C_6$ olefins or $C_8$ olefins that are easily and efficiently cracked to $C_3$ and $C_4$ olefins may also be used. For example, pyroylsis of 2,4,4-trimethylpentene-1 followed by oxidation of the pyrolytic products has provided good yields of methacrolein. The use of separate reaction zones for the pyrolysis of the isobutylene dimer and for the oxidation of the pyrolytic products have still further improved methacrolein yields.

The amount of oxygen used in the reaction will vary over narrow limits. Amounts of oxygen between about 0.1 and 3.0 mols of oxygen per mol of olefin may be utilized and amounts between 0.5 and 1.2 mols of oxygen per mol of olefin are preferred. The oxygen may be added as pure oxygen or as air. Normally the oxygen ratio will be decreased as operational temperatures are increased.

Temperatures between about 450° C. and 750° C. have been useful in producing the unsaturated aldehydes in accordance with this invention. Temperatures ranging from about 550° C. to 650° C. are more preferred. These temperatures are hot spot temperatures or the highest temperature present in the reaction zone. One of the advantages of this invention is that one can use relatively high set temperatures without incurring runaway or an uncontrolled oxidation reaction. Set temperatures may be defined as the temperature of the reaction zone prior to the introduction of the oxidation reactants. In the past when set temperatures of greater than 400° C. were utilized in oxidizing olefins over a silver oxide catalyst a runaway or uncontrolled exothermic oxidation reaction generally resulted. In contrast, set temperatures of 400° C. and even set temperatures of 500° C. and higher may now be employed in accordance with this invention without initiating a runaway or an uncontrollable oxidative reaction. For example, unsaturated aldehyde yields of 60 mol percent and even higher based on the amount of olefin converted may now be obtained without forming large quantities of combustion products as compared to about 10 mol percent yields when only silver oxide is used as the catalyst.

Generally this process is operated at atmospheric pressures; however, super atmospheric or sub atmospheric operating conditions may be employed. Pressures as high as 10 atmospheres and as low as 10 mm. of mercury absolute or its equivalent have been used and good results obtained.

The reactants are normally diluted with an inert diluent. Although amounts of diluent as low as one mol of inert diluent per mol of olefin and as high as 30 mols of diluent per mol of olefin may be used, the latter mol ratio is in excess and is generally unnecessary. Normally the diluent utilized will be in an amount such that the total amount of olefin present in the total reaction mixture will not be less than 10 mol percent of the total reaction mixture. Rich olefin streams of 10 to 40 mol percent based on the total volume of the reaction mixture have given excellent yields of unsaturated aldehydes even at high operating temperatures. Inert diluents that may be utilized in this invention include any material that will not react with the feed, reactants or reaction products. Diluents such as helium, nitrogen, carbon dioxide, steam, methane, and the like, have been used to advantage; however, steam is preferred. Contact times as low as 0.005 second to one second have been utilized to advantage. Contact times between 0.05 and 0.5 second are preferred. The lower the contact time, the higher are the space time yields. Space time yields are defined as the relationship of product per unit volume of catalyst per unit time. Space time yields exceeding 500 grams/liter/hour have been obtained by the process of this invention. Prior to this invention space time yields of about 40 grams/liter/hour could be obtained at set temperatures between about 400° C. to 600° C. only by sacrificing large quantities of feed material as combustion products.

The catalyst employed in this invention is a promoted silver type catalyst. In preparing the catalyst compositions the silver is generally used as the oxide, although silver salts such as silver nitrate, silver acetate, silver carbonate, silver citrate, and the like, which are convertible as by decomposition or oxidation to the oxide may be used. The active silver compound is promoted or activated with specific amounts of phosphorus compounds convertible to the oxides, such as phosphorus pentoxide or salts. While the silver is usually present in the catalyst mixture in weight excess to the phosphorus, atomic ratios of silver to phosphorus of less than 1:1 to 10:1 may be used. Atomic ratios of silver to phosphorus of about 1.1:1 to 3:1 atoms of silver per atom of phosphorus are normally preferred. The catalyst may be prepared in a variety of ways, as by mixing silver oxide and phosphorus pentoxide from solutions or slurries containing silver and phosphorus compounds, and the like. When stoichiometric amounts of silver and phosphorus compounds are used as in solutions, it is assumed that at least some silver phosphate is formed. It is also believed that silver phosphate is present in the catalyst under the reaction conditions. Regardless, when the catalyst is prepared by mixing silver and phosphorus compounds which preferably are decomposable or convertible to the oxides, and the silver and phosphorus are present in the defined proportions, an improved and activated catalyst used in accordance with this invention is obtained. So long as the catalyst preferably contains silver, phosphorus and oxygen atoms combined together and in the critical proportions of silver and phosphorus, a useful catalyst is obtained.

The catalyst actives may be deposited on a variety of catalyst supports including Alundum, quartz chips, alumina balls, silicon carbide, and the like. The catalyst actives comprising silver, phosphorus and oxygen compounds may be deposited on the catalyst supports from an aqueous slurry of the oxide, or may be deposited by impregnating the support with a solution of salts. If desired, the catalysts may be pelletized and utilized without a support but a supported catalyst is usually preferred. The amount of catalysts actives on a support may vary quite widely, but usually will be from 1 to about 30 weight percent, and more normally from about 5 to about 15 weight percent. Ten weight percent of a catalyst mixture prepared from about 6 weight percent silver oxide and about 4 weight percent phosphorus pentoxide deposited from water on 90 weight percent of Alundum particles has been used to obtain excellent yields of arcolein and methacrolein at a set temperature of 500° C. and a reaction temperature of 620° C.

A variety of reactors may be used in the practice of this invention. Generally large diameter tubular reactors which can be easily charged and emptied of catalyst are preferred. Tubular reactors of small diameter may also be used. Any desired reactor that can be efficiently operated without creating excessive flow restrictions or back pressures may be used and good results obtained. A fluidized bed type reactor may also be advantageously used, with minor modifications, in the operation of the invention.

Specific embodiments are set forth in the following examples. Percent conversion refers to the mols olefin consumed per 100 mols of olefin fed to the reactor, and percent yield refers to the mols of aldehyde produced per 100 mols of aldehyde consumed. All runs reported in the examples were made in a stainless steel reactor having an internal diameter of 22 mm. and being approximately 24 inches in length. Heat was supplied to the reactor by means of strip heaters vertically placed about the stainless steel block reactor. Usually the uppermost part of the reactor was used empty as a preheat section for the reaction zone which was located directly below the preheat section. The reactants were metered by calibrated rotameters into a manifold located at the top of the reactor. The reactants were preheated in the preheat section of the reactor and then passed into the reaction zone of the reactor. The hot effluent gases were sampled through sampling ports located just below the heated section of the reactor by means of an insulated syringe heated to a temperature of 160° C. In analyzing the effluent stream, two chromatographic samples were generally taken, one of which was analyzed for the unsaturated aldehyde produced, while the second was analyzed for the gases, oxygen, nitrogen, and carbon monoxide.

*Example 1*

A catalyst consisting of 90 parts by weight of Alundum particles having a Tyler screen size from 10 to 12, 8.3 parts by weight of $Ag_2O$ and 1.7 parts by weight of $P_2O_5$ was prepared by depositing an aqueous slurry of the silver oxide and phosphorus pentoxide on the Alundum support. The catalyst mixture was then dried over a hot plate with constant mixing at a temperature of about 300° C. When dried, 13.3 cc. of the prepared catalyst was placed in the lowermost portion of the reactor tube. This volume of catalyst occupied approximately the lower 1½ inches of the reactor tube. The 10½ inch section located above the catalyst was left empty and was utilized as a preheat zone. The reactor was then heated to a set temperature of 500° C. A mixture consisting of 10 percent by volume of isobutylene, 10 percent by volume of oxygen, and 80 percent by volume of steam was passed through the reactor. The contact time was 0.27 second. The hot spot or reaction temperature was approximately 560° C. At a set temperature of about 550° C., analysis of the hot effluent indicated that a methacrolein yield of 60.9 percent based on the isobutylene consumed was obtained. The space time yield was in excess of 450 grams/liter/hour. When this example is repeated with only silver oxide catalyst, the reaction was difficult to control, a lower yield of methacrolein was obtained and large quantities of carbon oxides were obtained.

*Example 2*

Example 1 was repeated with the exception that the mol volume percent of isobutylene was increased to 30 mol percent and the diluent ratio was reduced to 1.3 mols of diluent per mol of isobutylene. The contact time was also reduced from 0.27 second to 0.10 second. A set temperature of 500° C. and a reaction temperature of 544° C. were employed. A chromatographic analysis of the hot effluent indicated a methacrolein yield of 63.6 mol percent based on the isobutylene converted. A space time yield in excess of 500 grams/liter/hour was obtained.

*Example 3*

Example 1 was repeated with the exception that propylene was substituted for the isobutylene feed. A chromatographic analysis of the effluent showed that the conversion of propylene feed was in excess of 50 mol percent with selective yields to acrolein in excess of 70 mol percent. When this example was repeated with an unmodified silver oxide catalyst, the reaction was difficult to control, a lower yield of acrolein was obtained and large quantities of carbon oxides were obtained. When the above example is repeated with the exception that 2,4,4-trimethylpentene-1 was substituted for the propylene, chromatographic analysis of the effluent showed that substantial yields of acrolein and methacrolein were obtained.

We claim:

1. A process for the vapor phase production of methacrolein which comprises contacting an isobutylene mixture comprising about 0.5 to 3 mols of oxygen per mol of isobutylene at temperatures between about 450° C. to 650° C. with a catalyst containing silver and phosphorus in an atomic ratio of 1 to 10 atoms of silver per atom of phosphorus as the oxides for about 0.05 to about 0.5 second.

2. A process for the vapor phase production of acrolein which comprises contacting a propylene mixture comprising about 0.5 to 3 mols of oxygen per mol of propylene at a temperature between about 450° C. and 650° C. with a silver oxide catalyst containing silver and phosphorus in an atomic ratio of 1 to 10 atoms of silver per atom of phosphorus as the oxides for about 0.05 to about 0.5 second.

3. A process for the vapor phase oxidation of an unsaturated olefin containing from 3 to 8 carbon atoms to an unsaturated aldehyde containing 3 to 4 carbon atoms which comprises contacting at a temperature between about 500° C. and 650° C. a mixture containing oxygen and said olefin in a molar ratio of 0.5 to 1.2 mols of oxygen per mol of said olefin over a catalyst initially containing 1 to 3 atoms of silver per atom of phosphorus as the oxides, said olefin being present in a concentration of about 10 to 40 mol percent, for about 0.005 to 0.5 second.

4. The process of claim 3 wherein the olefin is isobutylene.

5. The process of claim 3 wherein the olefin is propylene.

6. The process of claim 3 wherein the olefin is 2,4,4-trimethylpentene-1.

References Cited by the Examiner

UNITED STATES PATENTS 2,398,612    4/1946    Bergsteinsson et al. __ 260—604

FOREIGN PATENTS 605,502    10/1961    Belgium.

LEON ZITVER, *Primary Examiner.*

J. J. SETELIK, R. H. LILES, *Assistant Examiners.*